Patented Jan. 26, 1943

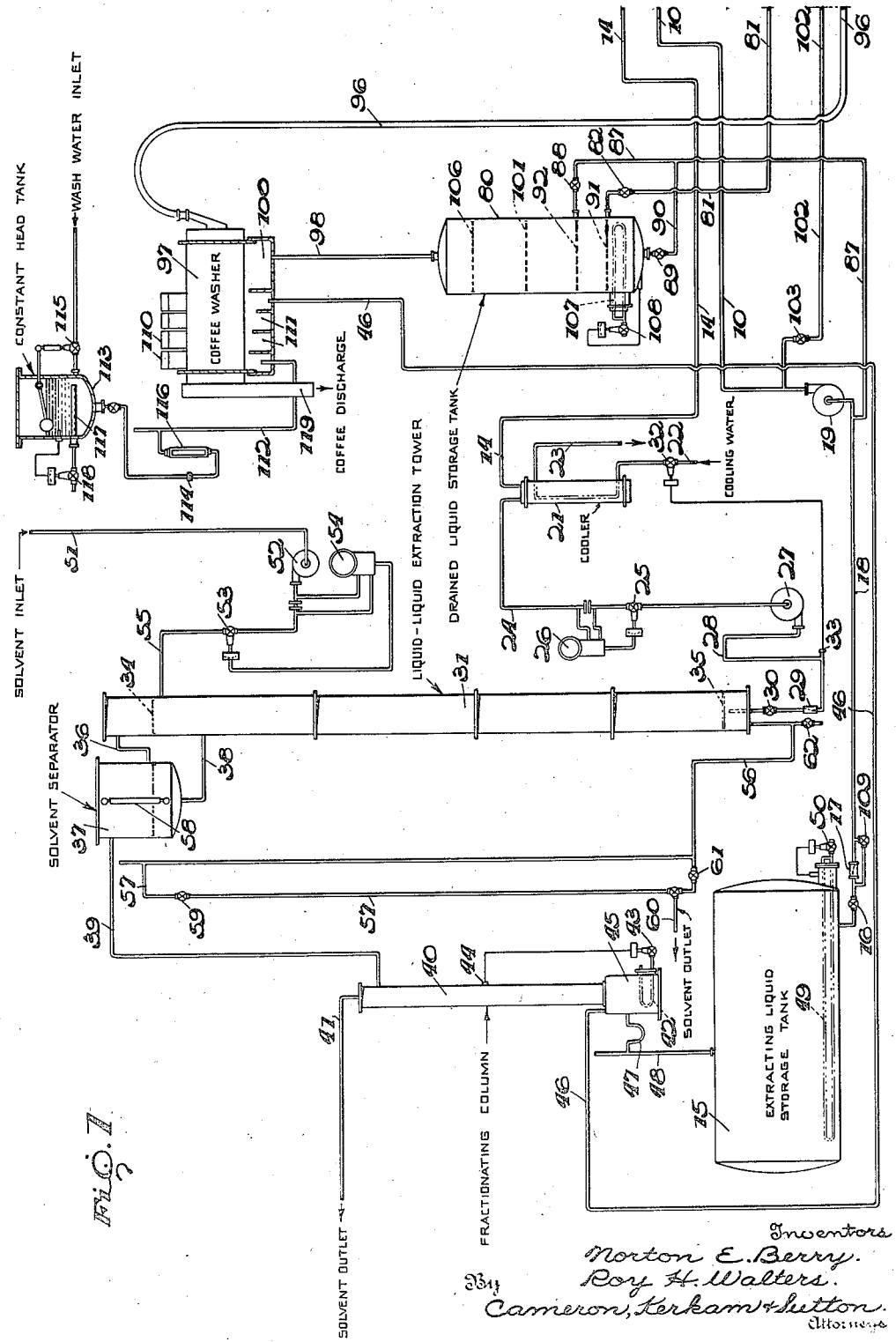

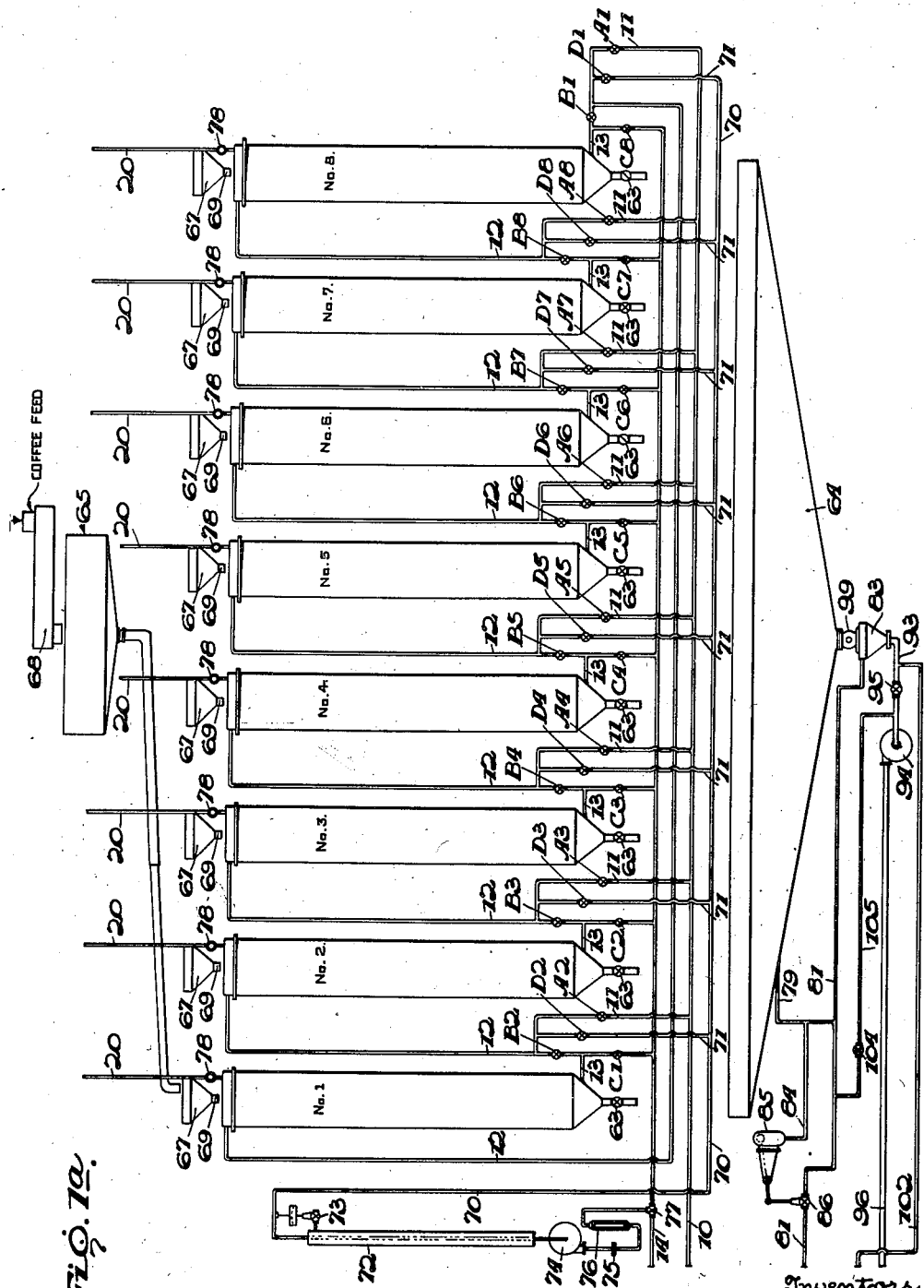

2,309,092

UNITED STATES PATENT OFFICE 2,309,092

PROCESS OF DECAFFEINATING COFFEE

Norton E. Berry, Summit, and Roy H. Walters, Rutherford, N. J., assignors to General Foods Corporation, New York, N. Y., a corporation of Delaware Application May 9, 1941, Serial No. 392,794

9 Claims. (Cl. 99—70)

This invention relates to the continuous decaffeination of green coffee beans and more particularly to an improved process effecting the extraction of caffein with water.

Decaffeination as hitherto commercially practiced has been carried out by batch extraction of green coffee beans with suitable organic solvents, such as trichlorethylene and the like, in which caffein is freely soluble but in which the solubility of the other water-soluble constituents of the coffee is relatively small. The loss of these water-soluble constituents other than caffein must be minimized and preferably should be entirely prevented if the decaffeinated coffee is to retain the natural flavor and aroma of the original coffee. On the other hand, the use of organic solvents has various disadvantages. It is known that organic solvents deleteriously affect the flavor of the coffee, probably because of chemical reaction with the coffee constituents. Organic solvents also remove water-insoluble matter in the form of wax from the coffee, which further affects the flavor of the final product and decreases its weight.

Moreover, the extraction of caffein from coffee by organic solvents is both difficult and time-consuming in practice. The caffein diffuses out of the beans into the surrounding solvent only very slowly, even when the common practice is followed of preliminarily soaking or steaming the beans until the caffein is dissolved in the absorbed moisture within the beans before they are subjected to the organic solvent. Then the solvent which is necessarily absorbed by the beans during extraction must be entirely removed from the extracted coffee, which requires a second steaming for a protracted period of time. The last traces of contained solvent are extremely difficult to remove, which makes this operation particularly time-consuming. The combination of steaming, extraction and second steaming usually requires from forty to forty-eight hours. There is also the problem in recovering the solvent of separating it not only from the caffein but from the water-insoluble wax, and if the caffein is to be recovered, it too must be separated from the wax.

Various refinements of the general procedure stated above have been suggested from time to time since the commercial production of decaffeinated coffee was instituted more than thirty years ago. The possibility has also been suggested that the extraction of caffein be carried out directly with water which has had built up therein an equilibrium concentration of the other water-soluble constituents of the coffee to prevent their loss. However, despite the rapidly expanding production of decaffeinated coffee, particularly in the last ten years, the decaffeination procedure in use today is still substantially the same as that generally set forth above with all of its attendant disadvantages.

Broadly stated, the present invention is directed to the elimination of the disadvantages inherent in decaffeination procedures heretofore employed and provides for the first time a practical and commercially satisfactory process for continuous decaffeination of coffee by means of water, which makes possible the efficient and economical production of an improved decaffeinated coffee having the same flavor and aroma as the original coffee.

The operation of the process and its advantages will be better understood from the following description of a practical embodiment of the invention, but it is to be understood that this embodiment as specifically described and illustrated in the accompanying drawings is for purposes of example only and is not to be construed as a definition of the limits of the invention.

In the drawings,

Figs. 1 and 1a taken together illustrate diagrammatically a complete system adapted for the practice of the invention.

As will be understood from the following description, the process comprises a continuous countercurrent extraction, green coffee being supplied to one end of the extraction zone and fresh extracting liquid, which comprises an aqueous solution of the water-soluble constituents of coffee other than caffein, to the other end of the zone. If desired, the coffee and extracting liquid can be continuously moved through the extraction zone in opposite directions, but the particular system illustrated in the drawings comprises a continuous countercurrent battery system wherein true countercurrent operation takes place by flowing the extracting liquid continuously through a battery of extractors in one direction while the positions of the individual extractors relative to the flow of extracting liquid are progressively advanced in the opposite direction. It will be understood that references hereinafter to continuous countercurrent extraction are intended to apply to both of these methods.

In describing the operation of the system illustrated in the drawings it is convenient to divide the entire process into three parts which may appropriately be termed I. Coffee extraction;

II. Coffee dumping and filling; and III. Coffee washing.

I. Coffee extraction

The extraction zone (Fig. 1a) may comprise any suitable number of extractors and as here shown consists of a battery of eight extractors numbered consecutively from 1 to 8. The extracting liquid flows continuously through these extractors in series, a system of pipes and valves being arranged so that the liquid may enter any one of the eight extractors as the first in the series and leave from any one of the extractors as the last in the series. To this end the liquid supply header 10 is provided with a series of branch pipes 11 each connected to a riser 12 leading into the top of an extractor. The flow of extracting liquid through the pipes 11 is controlled by a series of inlet valves $A_1$ to $A_8$, the numbers corresponding to the numbers of the extractors into which the liquid flows. The liquid leaves the bottom of each extractor through a pipe 13 having two branches, one of which is connected to the next riser 12 and the other to a liquid discharge header 14. The flow of liquid from the bottom of one extractor through the riser 12 into the top of the next extractor is controlled by one of a series of connecting valves $B_1$ to $B_8$, the number of each valve corresponding to the number of the extractor into which the liquid flows. The flow of liquid from the bottoms of the extractors into the discharge header 14 is controlled by a series of discharge valves $C_1$ to $C_8$, the numbers corresponding to the numbers of the extractors from which liquid is discharged.

Assuming that the battery is in normal operation and that extractor No. 3 has been filled with green coffee, then extractor No. 4 is the first in the series relative to the flow of extracting liquid and extractor No. 3 is the last. Hence valve $A_4$ is open and the remaining A valves are closed; valve $B_4$ is closed and the remaining B valves are open; and valve $C_3$ is open and the remaining C valves are closed. Valves $D_1$ to $D_8$ hereinafter described are also closed. Under these conditions the extracting liquid flows from supply header 10 through pipe 11, valve $A_4$ and riser 12 into the top of extractor No. 4; from the bottom of extractor No. 4 the liquid flows through pipe 13, valve $B_5$ and riser 12 into the top of extractor No. 5; and similarly in succession through extractors Nos. 6, 7, 8, 1, 2 and 3, being discharged from the latter through pipe 13 and valve $C_3$ into the discharge header 14.

The main body of extracting liquid is held in a storage tank 15 at a suitable elevated operating temperature, preferably about 200° F. The liquid leaves the bottom of the tank 15 through an outlet valve 16 and check valve 17 located in the discharge line 18 leading to a pump 19 which delivers the liquid into the supply header 10 under a hydrostatic head sufficient to lift it to a point above the tops of the extractors but not to the height of the open vent lines 20 extending from the tops of the extractors.

The extracting liquid circulated through the series of extractors as above described becomes laden with caffein which must be removed by a suitable solvent such as trichlorethylene, and although cooled somewhat below its initial temperature of 200° F. during its passage through the extractors, it is still considerably above the mutual boiling point of extracting liquid and trichlorethylene. Accordingly the extracting liquid is conducted by the discharge header 14 to a suitable cooler 21 through which a cooling medium such as water is circulated by means of an inlet pipe 22 and outlet pipe 23. The flow of extracting liquid leaving the cooler through a pipe 24 is preferably regulated by a throttling valve 25 controlled by a flow recorder 26, and is forced by a pump 27 through a loop 28, check valve 29 and inlet valve 30 into the bottom of a liquid-liquid extraction tower 31. The flow of cooling water through the cooler 21 is controlled by means of a valve 32 which is actuated by a suitable thermostatic device 33 subjected to the temperature of the extracting liquid between the pump 27 and the tower 31. The pump 27 must overcome the difference between the hydrostatic head at the pump and that at the bottom of the tower 31, taking into account the density of the solvent in the tower which is greater than that of the extracting liquid. The loop 28 between the pump and the bottom of the tower 31 provides a seal to prevent the trichlorethylene from backing out of the tower into the pump, and the check valve 29 prevents the solvent from passing out through the extracting liquid line and back into the extractors in case of failure of the pump 27.

The tower 31 preferably comprises a packed column which is maintained full of trichlorethylene up to a level 34 as hereinafter described. The extracting liquid which enters the bottom of the tower through the valve 30 passes through a distributor 35 and bubbles up through the packed column, overflowing through a pipe 36 which leads to a solvent separator tank 37 in which any entrained trichlorethylene is given an opportunity to separate from the extracting liquid and to return to the tower through a pipe 38.

The extracting liquid, freed of entrained trichlorethylene but still containing a small quantity of dissolved solvent, overflows from the top of solvent separator 37 through a pipe 39 and enters the top of a fractionating column 40. The vaporized solvent separated from the extracting liquid in the column 40 is carried away from the top of the column through a pipe 41 to suitable solvent recovery and storage apparatus. The heat required for fractionation in the column 40 is supplied by a steam coil 42 controlled by a temperature controller 43 responsive to a suitable thermostatic device 44 subject to the temperature within the column 40. The extracting liquid collects in the still pot 45 at the bottom of the column 40, where it is mixed with wash water entering through a pipe 46 as hereinafter described, the mixture of extracting liquid and wash water overflowing from the still pot through a loop seal 47 and passing into the top of the storage tank 15 through a vented pipe 48.

The mixture of wash water and extracting liquid entering the storage tank from the still pot 45 will be at a temperature of approximately 212° F. due to the steam coil heater 42. The main body of extracting liquid in the storage tank, as stated above, is thus normally maintained at a temperature of about 200° F. at which temperature it leaves the tank and passes to the extractors as described above. In case of a shutdown of the system when all of the extracting liquid is stored in the tank 15, its temperature should not be permitted to fall below 160 or 170° F. and for this purpose the tank 15 is provided with a steam coil heater 49 controlled by a temperature controller 50. The heater 49 should also be capable of raising the temperature of the body of liquid from this lower temperature to the normal operating temperature in a reasonable amount of time preparatory to starting up the system after a shutdown.

The solvent which effects decaffeination of the extracting liquid in the tower 31, in this case trichlorethylene, is supplied through a pipe 51 and pump 52 which is capable of producing sufficient hydrostatic head to lift the trichlorethylene to the top of the tower. From the pump 52 the solvent flows through a control valve 53 which is automatically operated by a flow recorder 54 to maintain the desired rate of flow, after which it enters the top of the tower 31 through a pipe 55. During its passage downwardly through the tower, the solvent extracts caffein from the rising extracting liquid and the caffein-laden solvent flows out of the bottom of the tower through a pipe 56 and back up to a vented overflow 57. Thus the position of the overflow line 57 determines the level 34 of solvent in the tower 31, as indicated by the level in a sight glass 58 connected to the solvent separator 37. From the overflow 57, solvent passes through a normally open valve 59 to a spent solvent discharge line 60 which leads to a suitable solvent recovery system. A by-pass valve 61 permits of draining the tower 31 down to the level of the valve when necessary, and a valve 62 at the bottom of the tower is provided in case complete drainage is desired.

II. Coffee dumping and filling

Assuming that operation of the battery of extractors has continued for a time as above described and that extractor No. 4 is ready to be dumped and refilled with fresh coffee, the next step is to open valve $A_5$ and to close valve $A_4$, after which valve $B_5$ is closed. This cuts extractor No. 4 from the system and since valves $B_4$ and $C_4$ remain closed, the normal flow of extracting liquid now enters the top of extractor No. 5 and continues through the series to the bottom of extractor No. 3 as before. Discharge valve 63 in the bottom of extractor No. 4 is then opened and the contents of the extractor are dumped into a hopper 64 located below the battery of extractors. Should some of the contents fail to dump, valve 63 may be reclosed and valve $B_5$ reopened to permit a quantity of extracting liquid to accumulate in the bottom of the extractor after which valve $B_5$ is reclosed and valve 63 reopened to flush the remaining coffee into the hopper below.

When all the coffee has been dumped, valve 63 is closed and extractor No. 4 is then ready for refilling with a new charge from a supply hopper 65 provided with a swing spout 66 so arranged as to discharge into any one of a series of filling hoppers 67 located above the individual extractors. Immediately after the filling of one extractor, the swing spout 66 is moved into position over the filling hopper 67 of the next extractor and a feed screw 68 is started to feed coffee from storage to the supply hopper 65. The feed screw is so controlled as to shut off the supply when a proper charge has been fed into the hopper 65 and coffee from the latter flows through the spout 66 into the hopper 67 until its level therein seals off the end of the spout. At the proper time, dump valve 69 in the bottom of hopper 67 is opened and the entire charge of coffee is dumped into the extractor to be filled after which the valve 69 is closed and the spout moved to the next extractor where the operation is repeated.

As soon as extractor No. 4 has been filled with a new charge in the manner described, valves $B_4$ and $C_4$ are opened and valve $C_3$ is closed, placing the extractor back in the system and clearing the way for flow of extracting liquid from the bottom of extractor No. 3 into the top of extractor No. 4 and out of the bottom of the latter through valve $C_4$ into the discharge header 14. However, before this normal downward flow through extractor No. 4 is reestablished, a temporarily increased flow of extracting liquid in the reverse direction is set up in the extractor through a recirculating liquid header 70 connected to each of the risers 12 by means of branch pipes 71 and valves $D_1$ to $D_8$. Header 70 is connected through a steam jacketed heater 72, regulated by a temperature controller 73, to a pump 74 which in turn is connected through a fixed orifice 75 and flow meter 76 to a T connection 77 in the discharge header 14.

After the opening of valves $B_4$ and $C_4$ and the closing of valve $C_3$, valve $D_4$ is opened and the pump 74 is started. This causes the extracting liquid from the bottom of extractor No. 3 to be drawn through valves $B_4$ and $D_4$ and branch pipe 71 into header 70 and thence through heater 72, pump 74, T connection 77 and header 14 into the bottom of extractor No. 4 through valve $C_4$.

The rate of liquid flow through the pump 74, as indicated by meter 76 and controlled by orifice 75, should be great enough to bring about rapid filling of the extractor and suspension of the coffee therein without causing the coffee to pack solidly against the top thereof and still provide for a normal flow of extracting liquid through the T connection 77 back to the liquid-liquid extraction tower 31. Since the liquid is all drawn from extractor No. 3 and through it from the other extractors in the series, it accordingly follows that until extractor No. 4 is filled and the coffee has absorbed the maximum amount of solution, a temporarily increased flow of extracting liquid will be established in the supply header 10, part of the increase being provided, as hereinafter described, by the volume of extracting liquid previously dumped from extractor No. 4 and the remainder by liquid drawn from storage tank 15. When the level of extracting liquid in extractor No. 4 reaches the level of sight glass 78 in the vent line 20, it will discharge into the riser 12 and, mingling with the liquid drawn from the bottom of extractor No. 3 through pipe 13 and valve $B_4$, will flow out through valve $D_4$ and the header 70 to the pump 74 and back through the header 14 into the bottom of extractor No. 4 through valve $C_4$.

A controlled high-flow circulation of liquid upwardly through extractor No. 4 in addition to the normal flow of extracting liquid from the T connection 77 back to the liquid-liquid extraction tower 31 hence will be set up, preventing uneven packing or wedging of the coffee while it swells due to absorption of extracting liquid. At the same time, valve $A_5$ being open and valve $B_5$ closed, a normal flow of liquid from supply header 10 into the top of extractor No. 5 and thence through the remaining extractors back to the discharge from extractor No. 3 will be maintained. After a sufficient period of circulation of liquid up through extractor No. 4 to permit the coffee to swell to its maximum volume, during which any drop in the normal operating temperature of the liquid due to contact with the relatively cold coffee is corrected by the heater 72, the pump 74 is stopped and valve D4 is closed, thus reestablishing a normal flow of extracting liquid from the bottom of extractor No. 3 into the top of extractor No. 4 and out of the bottom thereof through valve C4 into the discharge header 14.

III. Coffee washing

The transfer of extracted coffee from the hopper 64 to the subsequent washing operation is preferably accomplished by pumping a slurry of coffee beans and extracting liquid. However, the coffee dumped into hopper 64, being heavier than the liquid, sinks in the hopper and means must be provided for forming the desired slurry as the coffee beans are removed from the bottom of the hopper. Accordingly the hopper 64 normally contains extracting liquid up to the level of a pipe 79, the liquid being supplied from a drained liquid storage tank 80 through a pipe 81 and outlet valve 82 and entering a mixing chamber 83 at the bottom of the hopper 64. Pipe 79 connects with the pipe 81 and has a branch 84 leading to the float chamber 85 of a float controlled valve 86 whereby the flow of liquid through pipe 81 is shut off whenever the liquid level in the hopper 64 rises above the pipe 79. Excess extracting liquid accumulated in the storage tank 80 at any time may be withdrawn through a pipe 87 fitted with a valve 88 and returned to the inlet side of the feed pump 19, while complete drainage of the tank 80 may be accomplished when desired by means of a normally closed valve 89 and a pipe 90 leading from the bottom of the tank to pipe 87.

Accordingly just before an extractor is dumped into the hopper 64, the liquid level therein will be approximately that of the pipe 79 and the liquid level in the tank 80 will be somewhere between levels 91 and 92 of the discharge pipes 81 and 87, respectively. Extracting liquid will be continuously withdrawn from the mixing chamber 83 by a pipe 93 and pump 94, the outlet valve 95 being open, and pumped through a pipe 96 into a coffee washer 97 from which it drains back into the tank 80 through a pipe 98. When an extractor is dumped into hopper 64, the liquid level therein immediately rises to its maximum, float valve 86 closes, and liquid starts to flow out through pipe 79 down through pipe 81 into the chamber 83 where it mixes with the extracted coffee being fed in at a constant rate by means of a suitable feeding device 99. The resulting slurry flows out of the bottom of the chamber 83 through the pump 94 and into the coffee washer 97.

The coffee washer consists of a suitably arranged cylindrical screen rotating above a series of drainage compartments. The slurry is discharged into one end of this screen and in the first section thereof the extracting liquid separates from the coffee and collects in compartment 100 from which it flows through pipe 98 into the tank 80. As long as the liquid level in hopper 64 is above the pipe 79, float valve 86 will be closed and no liquid will be returned to the mixing chamber 83 from the drained liquid tank 80. Consequently, the liquid in tank 80 will rise to approximately a level 101. Since valve 88 is always open, line 87 will then fill with liquid, and the hydrostatic head therein exerted back through its connection with pipe 18 will close check valve 17 at the outlet of storage tank 15 and the flow of extracting liquid from pump 19 to the battery of coffee extractors will thereafter be supplied from tank 80 until the liquid level in the tank drops to the level 92. As the liquid level in hopper 64 drops to the pipe 79, float valve 86 opens and the liquid necessary for slurry formation then flows out of tank 80 through pipe 81 into the mixing chamber 83. As more coffee is withdrawn from the hopper 64 additional liquid to replace the volume occupied by the coffee will flow from the tank 80 and the level therein will drop to somewhere between 91 and 92.

The cross line 102 extending from the outlet of chamber 83 to the discharge side of pump 19 is provided for emergency backwash in case coffee becomes plugged in the outlet pipe 93 of chamber 83. If this should happen, valve 95 can be closed and valve 103 in the line 102 opened, under which circumstances the full pressure of pump 19 will be applied in backwashing the outlet pipe 93. In case of severe trouble, valve 82 controlling the outlet from tank 80 to pipe 81 may be closed, and valve 104 in cross line 105 opened, under which circumstances hopper 64 may be pumped free of liquid through lines 81 and 105 and up through the washer 97 into tank 80. In case this is done, the liquid in tank 80 will rise to a level 106.

Some cooling of the extracting liquid may occur in hopper 64 and in washer 97, and hence a steam coil heater 107 controlled by a temperature controller 108 is preferably provided in tank 80 in order to maintain the normal 200° F. operating temperature.

After a dumped extractor has been filled with dry coffee and is about to be filled with extracting liquid, the liquid in storage tank 80 will be approximately at the level 101. When pump 74 is started to fill the extractor as described above liquid will first be drawn from tank 80 and the level therein will fall to 92. After this level is reached flow into line 87 will cease and the level therein will fall below that in storage tank 15, resulting in the opening of check valve 17 in line 18. The remaining liquid necessary to fill the extractor will then be drawn from the storage tank 15. In case the plant is shut down, and all of the extracting liquid is to be stored in storage tank 15, valve 89 at the bottom of tank 80 is opened to allow complete drainage of the tank. In order to drain rapidly into storage tank 15 valve 109 may be opened in order to by-pass check valve 17.

The coffee in the cylinder of washer 97, after passing over drainage compartment 100, enters the washing section of the washer. Here, the cylindrical screen is fitted with buckets 110 which dip into respective drainage compartments 111 below, and lift the wash water up to shower down through the screen and the coffee therein. The coffee moves through the cylindrical screen countercurrent to fresh wash water which is supplied through a line 112, the flow being controlled by means of a constant head tank 113 and an orifice 114 so that the amount of wash water added to the system is substantially equal to the volume of extracting liquid absorbed by the coffee. The water level in tank 113 is controlled by a float valve 115 and the rate of flow of wash water is indicated by a meter 116. The water in tank 113 may be heated to a temperature of approximately 200° F. by means of open steam heater 117 which is controlled by a temperature controller 118. The wash water entering through the line 112 flows from one compartment to the next over the interposed weirs and passes from the last compartment 111 through pipe 46 back to the still pot 45 of fractionating column 40 as previously described. The washed coffee which is continuously discharged from the washer cylinder leaves the washer through a chute 119 and is thereafter conveyed to suitable drying apparatus in which the excess moisture absorbed by it during the process is removed.

Considering the process as a whole, and bearing in mind the foregoing detailed description, it will be evident that extracting liquid containing a desired proportion of water solubles other than caffein is drawn by the pump 19 from the storage tank 15 and delivered at a temperature of about 200° F. to the top of the particular extractor of the battery containing the oldest charge of coffee. From the top of this extractor the liquid flows through charges of successively increased freshness in the remaining extractors, losing volume through absorption by the coffee and taking up caffein on the way, and passes from the last extractor in the series at a somewhat reduced temperature, probably about 190° F., through header 14 to the cooler 21. In the cooler the liquid is further reduced in temperature to about 160° F. and it is then delivered by pump 27 to the liquid-liquid extraction tower 31 wherein its caffein content is removed. Thereafter, the caffein-free liquid is freed of entrained and dissolved solvent in separator 37 and fractionating column 40 and, during reheating to a temperature of about 212° F. in the still pot 45, is restored to its original volume with wash water from washer 97 and returned to the storage tank 15. The individual charges of coffee in the extractors, meanwhile, after a suitable treatment period, are successively dumped into the hopper 64 for passage to the washer 97 and, after separation from their accompanying extracting liquid and removal of surface accumulations of water solubles from the beans, are conveyed from the washer to suitable apparatus for drying to their original moisture content.

In actual operation of the foregoing procedure, we have found that with a battery of eight extractors each holding a 1,000 pound charge of coffee, a normal flow rate of 3.3 gallons of liquid per minute (equivalent to circulation of about 1.8 pounds of liquid per pound of coffee treated) at the extraction temperatures indicated above will result in extraction of 98% of the caffein content of the coffee in a treatment period of eight hours, which means the dumping of one extractor charge every hour. Compared to the present commercial methods of decaffeination previously referred to, it accordingly will be apparent that the present invention makes possible a very great saving in the time required for extraction in that it completely eliminates both the preliminary soaking or steaming of the coffee prior to treatment with organic solvent and the subsequent steaming of the beans to remove the solvent therefrom. Moreover, the extraction of caffein from the coffee by means of an aqueous extracting liquid takes place much more rapidly than with organic solvents. Consequently, the production costs of our process in comparison with existing methods are very much lower.

Other very important advantages of the invention over present commercial practices reside in the improved characteristics of the decaffeinated coffee. Due to the fact that organic solvents never come in contact with the beans, undesirable reactions are prevented and the final product is practically indistinguishable from natural coffee as to flavor and aroma, the "extracted" taste of previous commercial products being entirely lacking. Also no wax is extracted from the coffee, resulting in an increased yield of a product more nearly the same as the natural coffee and providing a more satisfactory grind. Moreover, since no wax is extracted the purification and recovery of both caffein and solvent are much simpler and less expensive and the amount of caffein recovered is increased.

Although as stated above the possibility has been suggested of extracting caffein by means of a water solution in which water solubles other than caffein are concentrated to prevent their removal from the coffee, the difficulties involved in the application of this suggestion to actual practice have heretofore prevented its use for practical and commercial purposes. For example, it is necessary in such processes to extract the caffein from the extracting water solution by means of an organic solvent. Such liquid-liquid extractions require a total volume of organic solvent several times that of the liquid being extracted and unless the latter volume is kept small the amount of organic solvent required becomes excessive. Great difficulties are also involved in preventing contamination of the coffee with organic solvent dissolved or emulsified in the extracting liquid in the operation of removing the caffein therefrom. Due to the continuous operation of the system under the conditions described above, however, the volume of extracting liquid in proportion to the amount of coffee treated is small and the volume of organic solvent required to extract the caffein therefrom is reduced to a minimum and is brought within entirely practicable and economical limits. Further the conditions of the liquid-liquid extraction and the subsequent solvent separation are such as to make possible complete separation and recovery of the solvent from the extracting liquid and to avoid any possibility of contamination of the coffee.

High extraction temperatures are desirable to increase the rate of extraction of caffein from the coffee but involve difficulties in the liquid-liquid extraction referred to above. The temperature control maintained in the present process eliminates these difficulties and permits the use of relatively high extraction temperatures and correspondingly decreased extraction time, with the further result of improved flavor since we have found that the extracted coffee increases in flavor value with decreasing time of extraction. Hence we prefer to maintain extraction temperatures as close to the boiling point of the extracting liquid as is consistent with practical temperature regulation, say of the order of 200° F., and to reduce the temperature in the liquid-liquid tower 31 only to a point just below the mutual boiling point of the extracting liquid and solvent, say 160° F. in the case of trichlorethylene. Moreover, the high temperatures employed prevent changes in the extracting liquid which destroy the flavor value of the coffee, resulting in a "rusty" taste, whereas satisfactory continuous operation for extended periods is impracticable because of the effect of such changes on the flavor of the coffee.

One of the advantages of using water to extract the caffein is to prevent deleterious effects of organic solvents on the coffee flavor, but it is equally important to prevent other changes which might result from the solubility in the water of constituents of the coffee other than caffein and which might be manifested as loss of or change in color, flavor, aroma or other characteristics of normal roasted coffee. Depending on conditions of operation, these changes may be due to a loss of water solubles from the coffee to the surrounding water, to deposits of water-soluble matter on the surface of the coffee beans, etc. The latter is particularly objectionable since such deposits are caramelized in subsequent roasting, changing not only the flavor of the coffee but also the color of the roasted coffee which normally is the index of the extent of roasting desired. The development of these changes is prevented by the present invention by washing the extracted coffee with an amount of water substantially equal to the amount soaked up by the beans, thus removing surface deposits from the beans, and then adding the wash water with the dissolved surface deposits to the system to maintain a substantially constant volume of extracting liquid therein without loss of solids. Due to continuous operation with a constant volume of extracting liquid, a dynamic equilibrium is maintained between the solids in the coffee and the solids in the extraction liquid. In the storage tank 15, the extracting liquid contains about 15% soluble solids other than caffein, which is approximately the same concentration that would result in natural coffee which had absorbed the maximum amount of pure water. The beans leaving the system are in equilibrium with this solution leaving the storage tank, and when dried contain the normal amount of water solubles other than caffein. As the extracting liquid moves through the extraction zone countercurrently to the coffee, equilibrium is maintained although the concentration of soluble solids in the extracting liquid increases, particularly near the end of the zone, because of the increase in the total amount of solubles resulting from the addition of fresh coffee to the system. The concentration of solids in the extracting liquid leaving the extraction zone may be as high as 30%, but the restoration of its volume by the addition of wash water brings the concentration back to the starting point of about 15%.

Hence the extracted beans with an excess of moisture leave the extraction zone and enter the drying apparatus without surface coating and containing the normal amount of water solubles other than caffein. When dried to their normal moisture content, the caffein-free beans are otherwise substantially identical with untreated green beans. They may be roasted in the normal manner, resulting in a product practically indistinguishable from normal roasted coffee in color, flavor, aroma and other characteristics. This improved result is at the same time accomplished with a greatly reduced extraction time and in a continuous manner with correspondingly large reduction in production cost.

While only one embodiment of the invention has been described and illustrated in the drawings, it will be apparent to those skilled in the art that various changes may be made in the equipment used and in the details of operation of the process without departing from the spirit of the invention. Reference is therefore to be had to the appended claims for a definition of the limits of the invention.

What is claimed is:

1. A continuous process for the countercurrent extraction of caffein from green coffee which comprises adding coffee to one end of an extraction zone and withdrawing it from the other end while continuously flowing a water solution of coffee solubles through said zone countercurrently to the coffee, continuously circulating said solution through said zone and through a separate liquid-liquid extraction zone in which its caffein content is removed by contact with an organic solvent, washing the coffee withdrawn from said first-named zone in an amount of water substantially equal to the amount of said solution absorbed by the coffee, and adding said wash water to said solution to maintain a substantially constant volume thereof.

2. A continuous process for the countercurrent extraction of caffein from green coffee which comprises adding coffee to one end of an extraction zone and withdrawing it from the other end while continuously flowing a heated water solution of coffee solubles through said zone countercurrently to the coffee, continuously circulating said solution through said zone and through a separate liquid-liquid extraction zone in which its caffein content is removed by contact with an organic solvent, reducing the temperature of the solution entering said liquid-liquid extraction zone to a point below the mutual boiling point of said solution and said solvent, and reheating the solution returning to said first-named zone to remove any remaining solvent therefrom and to bring it to an extraction temperature of the order of 200° F.

3. A continuous process for the countercurrent extraction of caffein from green coffee which comprises adding coffee to one end of an extraction zone and withdrawing it from the other end while continuously flowing a water solution of coffee solubles at a temperature of the order of 200° F. through said zone countercurrently to the coffee, continuously circulating said solution through said zone and through a separate liquid-liquid extraction zone in which its caffein content is removed by contact with an organic solvent, reducing the temperature of the solution entering said liquid-liquid extraction zone to a point below the mutual boiling point of said solution and said solvent, washing the coffee withdrawn from said first-named zone in an amount of water substantially equal to the amount of said solution absorbed by the coffee, and adding said wash water to said solution to maintain a substantially constant volume thereof.

4. A process for the continuous countercurrent decaffeination of green coffee which comprises adding coffee to one end of an extraction zone and withdrawing it from the other end while continuously circulating a water solution of coffee solubles through said zone countercurrently to the coffee, removing caffein from the circulating solution leaving said zone by liquid-liquid contact with an organic solvent, freeing the circulating caffein-free solution of said solvent, washing the coffee withdrawn from said zone in an amount of water substantially equal to the amount of said solution absorbed by the coffee, and adding said wash water to said circulating solution to maintain a substantially constant volume thereof.

5. A continuous process for the countercurrent decaffeination of green coffee which comprises adding coffee to one end of an extraction zone and withdrawing it from the other end while continuously circulating a water solution of coffee solubles at a temperature of the order of 200° F. through said zone countercurrently to the coffee, removing caffein from the circulating solution leaving said zone by liquid-liquid contact with an organic solvent at a temperature below the mutual boiling point of said solution and said solvent, freeing the circulating caffein-free solution of said solvent while reheating said solution to said extraction temperature, washing the coffee withdrawn from said zone in an amount of water substantially equal to the amount of said solution absorbed by the coffee, and adding said wash water to said circulating solution to maintain a substantially constant volume thereof.

6. A continuous countercurrent process for the decaffeination of green coffee which comprises continuously flowing a water solution of coffee solubles consecutively through a series of extractors successively filled with coffee at equal intervals throughout a predetermined extraction period, the flow of solution initially entering the first-filled extractor in the series, dumping and refilling each extractor in the series at the end of an interval after the filling thereof equal to said predetermined period, shifting the inlet of the solution to the series from the dumped extractor to the succeeding extractor in the series and the outlet of the solution from the series to the refilled extractor, returning the drained solution from the dumped extractor to the flow of solution into said succeeding extractor, continuously decaffeinating the solution flowing from said outlet and returning caffein-free solution to said inlet, washing the dumped coffee with an amount of water substantially equal to the amount of solution absorbed by the coffee, and adding the wash water to the caffein-free solution to maintain a substantially constant volume thereof.

7. A continuous countercurrent process for the decaffeination of green coffee which comprises continuously flowing a water solution of coffee solubles consecutively through a series of extractors successively filled with coffee at equal intervals throughout a predetermined extraction period, the flow of solution initially entering the first-filled extractor in the series, dumping and refilling each extractor in the series at the end of an interval after the filling thereof equal to said predetermined period, shifting the inlet of the solution to the series from the dumped extractor to the succeeding extractor in the series, temporarily increasing the flow of solution through the series and circulating the additional volume of solution through said refilled extractor until the coffee therein has absorbed its maximum amount of solution, then shifting the outlet of the solution from the series to the refilled extractor, returning the drained solution from the dumped extractor to the flow of solution into said succeeding extractor, continuously decaffeinating the solution flowing from said outlet and returning caffein-free solution to said inlet, washing the dumped coffee with an amount of water substantially equal to the amount of solution absorbed by the coffee, and adding the wash water to the caffein-free solution to maintain a substantially constant volume thereof.

8. A continuous process for the countercurrent extraction of caffein from green coffee which comprises adding coffee to one end of an extraction zone and withdrawing it from the other end while continuously flowing a water solution of coffee solubles through said zone countercurrently to the coffee, continuously circulating said solution through said zone and through a separate caffein extraction zone in which its caffein content is removed by contact with a decaffeinating agent, washing the coffee withdrawn from said first-named zone in an amount of water substantially equal to the amount of said solution absorbed by the coffee, and adding said wash water to said solution to maintain a substantially constant volume thereof.

9. A process for the continuous countercurrent decaffeination of green coffee which comprises adding coffee to one end of an extraction zone and withdrawing it from the other end while continuously circulating a water solution of coffee solubles through said zone countercurrently to the coffee, removing caffein from the circulating solution leaving said zone by contact with a decaffeinating agent, freeing the circulating caffein-free solution of said agent, washing the coffee withdrawn from said zone in an amount of water substantially equal to the amount of said solution absorbed by the coffee, and adding said wash water to said circulating solution to maintain a substantially constant volume thereof.

NORTON E. BERRY.
ROY H. WALTERS.